T. A. ANDREWS.
FAUCETS.
No. 193,840.  Patented Aug. 7, 1877.
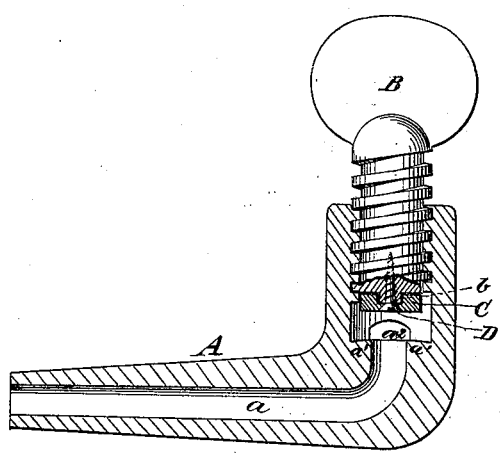
WITNESSES:
A. W. Almqvist
J. H. Scarborough
INVENTOR:
T. A. Andrews
BY Munn & Co.
ATTORNEYS.

UNITED STATES PATENT OFFICE.

THOMAS A. ANDREWS, OF GAINESVILLE, TEXAS.

IMPROVEMENT IN FAUCETS.

Specification forming part of Letters Patent No. 193,840, dated August 7, 1877; application filed May 5, 1877.

*To all whom it may concern:*

Be it known that I, THOMAS A. ANDREWS, of Gainesville, Cook county, Texas, have invented a new and Improved Faucet, of which the following is a specification:

The object of my invention is to provide a faucet which is inexpensive in its construction, easily repaired, and efficient in operation.

In the drawing, which is a longitudinal section, A is the body of the faucet, which is L-shaped, and contains a passage, $a$, which is enlarged, forming a valve-seat, $a^1$, and is threaded internally to receive the screw B.

A lateral oblong aperture, $a^2$, is formed in the body A, just above the valve-seat $a^1$, for the escape of liquid from the faucet.

The inner end of the screw B is provided with a square projection, $b$, to which is fitted a packing-disk, C, of elastic material, which is secured to the screw B by a screw, D.

The screw B is provided with a handle or thumb-piece, by which it may be turned, and the body of the faucet is provided with a tapering portion, which may be driven or screwed into the vessel or pipe in connection with which the faucet is used.

The advantages claimed for my improved faucet over others now in use are that it may be more cheaply manufactured, is more easily repaired, and is perfectly secured against leakage.

Having thus described my invention, I claim as new and desire to secure by Letters Patent—

The combination of internally-threaded L-shaped body A, having valve-seat $a$ and oblong aperture $a^2$, the screw B, having the projection $b$ and the elastic packing secured to screw B, as and for the purpose specified.

THOMAS A. ANDREWS.

Witnesses.
  W. O. DAVIS,
  CHAS. E. EDWARDS.